(12) United States Patent
Cheung et al.

(10) Patent No.: US 8,903,209 B2
(45) Date of Patent: Dec. 2, 2014

(54) SPECTRAL BEAM COMBINING AND WAVELENGTH MULTIPLEXING WITH AN OPTICAL REDIRECTING ELEMENT

(75) Inventors: Eric C. Cheung, Torrance, CA (US); Stephen P. Palese, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 881 days.

(21) Appl. No.: 12/215,293

(22) Filed: Jun. 26, 2008

(65) Prior Publication Data

US 2009/0324170 A1 Dec. 31, 2009

(51) Int. Cl.

| | | |
|---|---|---|
| G02B 6/34 | (2006.01) | |
| G02B 6/26 | (2006.01) | |
| G02B 6/28 | (2006.01) | |
| G02B 6/293 | (2006.01) | |
| G02B 5/09 | (2006.01) | |
| G02B 27/10 | (2006.01) | |

(52) U.S. Cl.
CPC ............... *G02B 6/2931* (2013.01); *G02B 5/09* (2013.01); *G02B 27/1006* (2013.01); *G02B 27/1086* (2013.01); *G02B 6/29311* (2013.01); *G02B 6/29373* (2013.01); *G02B 6/2938* (2013.01)
USPC .................................. 385/37; 385/16; 385/24

(58) Field of Classification Search
USPC ................................ 385/31, 33–37
See application file for complete search history.

(56) References Cited

U.S. PATENT DOCUMENTS

| | | | | |
|---|---|---|---|---|
| 6,415,073 | B1 | 7/2002 | Cappiello et al. | |
| 6,570,704 | B2 * | 5/2003 | Palese | ............ 359/349 |
| 6,711,316 | B2 * | 3/2004 | Ducellier | ......... 385/17 |
| 7,233,442 | B1 | 6/2007 | Brown et al. | |
| 2009/0153968 | A1 * | 6/2009 | Goodno | ........ 359/571 |

* cited by examiner

*Primary Examiner* — Michelle R Connelly
(74) *Attorney, Agent, or Firm* — Carmen Patti Law Group, LLC

(57) ABSTRACT

A method of spectral beam combining comprising the steps of projecting a plurality of laser beamlets of different wavelengths onto a first spectrally dispersive element, spatially chirping the plurality of beamlets via the first spectrally dispersive element, rearranging the spatially chirped beamlets with a beam redirecting element, and combining the beamlets into a single output beam via a second spectrally dispersive element.

29 Claims, 9 Drawing Sheets

SPECTRAL BEAM COMBINING AND WAVELENGTH MULTIPLEXING WITH AN OPTICAL REDIRECTING ELEMENT

TECHNICAL FIELD

This invention relates generally to spectral beam combining, and wavelength multiplexing and demultiplexing with a beam redirecting element. More particularly, the invention relates to spectral beam combining, and wavelength multiplexing and demultiplexing with large acceptance bandwidth and high spectral density using a beam redirecting element.

BACKGROUND

In the field of laser technologies there is a constant need to create ever more powerful lasers while maintaining laser beam quality. The quality of a laser beam is typically measured by how tightly a laser beam can be focused on a target. A diffraction limited beam is a beam that is of the best quality and thus may be tightly focused on a target. One way to increase beam power while maintaining the quality of a laser beam is through Spectral Beam Combining (SBC). Spectral Beam Combining involves combining a plurality of laser beams with differing wavelengths into a single beam using a spectrally dispersive element.

Spectral beam combining may also be used in the field of Wavelength Division Multiplexing and Demultiplexing (WDM). Wavelength Division Multiplexing fiber optic systems transmit multiple wavelength signals through a single fiber over long distances. At the transmitter end, receiver end and add-drop nodes, wavelengths need to be combined (multiplexed) and/or separated (demultiplexed). Wavelength Division Multiplexing and demultiplexing should be done with a large acceptance bandwidth, that is, such that the optical loss through the device does not vary over a large wavelength range.

Present SBC techniques produce diffraction limited beams only for lasers with narrow and precisely fixed wavelengths. For broadband lasers, when performing SBC different spectral components in each beam are dispersed in different directions and the resultant output beam quality is degraded. This is known as spatial chirping. Further, when performing SBC using a laser with a wavelength that is not well controlled or drifts over time, the combined beam will not be diffraction limited. Present SBC designs mitigate this problem by widely separating wavelengths between adjacent elements relative to the laser wavelength drift. As a result present SBC techniques cannot pack wavelengths tightly together resulting in poor utilization of available spectrum, or low spectral density utilization. Therefore, a goal in the field of art is to combine beams with large acceptance bandwidth, or high spectral density, capable of combining large number of elements to produce a powerful diffraction limited output beam.

SUMMARY

One embodiment of a method and system is a method of spectral beam combining comprising the steps of projecting a plurality of laser beamlets of different wavelengths onto a first spectrally dispersive element, spatially chirping the plurality of beamlets via the first spectrally dispersive element, rearranging the spatially chirped beamlets with a beam redirecting element, and combining the beamlets into a single output beam via a second spectrally dispersive element.

Another embodiment of the method and system encompasses a system. The system may comprise a plurality of laser beamlets, a first spectrally dispersive element, a second spectrally dispersive element and a beam redirecting element. The plurality of laser beamlets are projected onto the first spectrally dispersive element, which spatially chirps the beamlets, and the spatially chirped beamlets are projected onto the beam redirecting element which rearranges the spatially chirped beamlets into a single output beam via the second spectrally dispersive element.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Embodiments of the present method and system perform spectral beam combining and wavelength multiplexing with a beam redirecting element.

As mentioned, in the field of laser technologies it is desirable to increase laser output power while maintaining laser beam quality. One way to accomplish this goal is to combine a plurality of laser beams with differing wavelengths into a single beam by using a spectrally dispersive element. Combining laser beams using spectrally dispersive elements may lead to spatial chirping in a combined output beam. Spatial chirping occurs in a laser beam when the wavelength of the beam varies transversely across the beam. Spatial chirping in a laser beam leads to a decrease in beam quality and laser intensity on target. Spatial chirping also limits the useful spectral density of the system, or how tightly beam wavelengths can be combined.

Turning to FIGS. 1a-d, which illustrate some of the current SBC methods and systems and highlights some of the problems that may be encountered using current SBC systems and methods. Although the depictions in FIGS. 1a-d are presented using reflective spectrally dispersive elements, the problems depicted may result from transmissive spectrally dispersive elements as well as other spectrally dispersive elements.

Figure 1A:
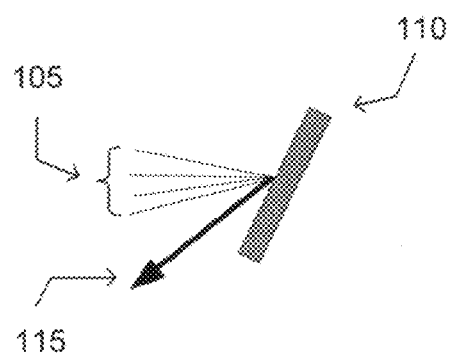
FIGS. 1a-d illustrate some of the current Spectral Beam Combining systems and methods.

FIG. 1a depicts a plurality of single frequency precisely stable and narrow wavelength laser beams 105 diffracting from a spectrally dispersive element 110. The spectrally dispersive element 110 may be a diffraction grating. The beams 105, in this example, are precisely accurate and narrow wavelength beams 105. Beams of this type may be combined via a reflective diffraction grating 110 to produce a diffraction limited output beam 115 exhibiting minimal spatial chirp. The diffraction limited beam 115, however, may only be produced via a spectrally dispersive element 110 with today's art when using lasers beams of a single frequency and precise wavelength 105.

Figure 1B:
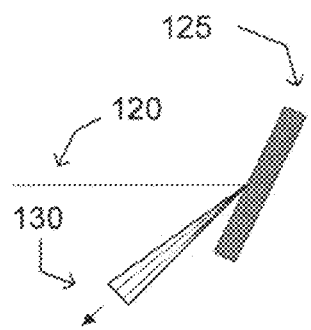
Figure 1C:
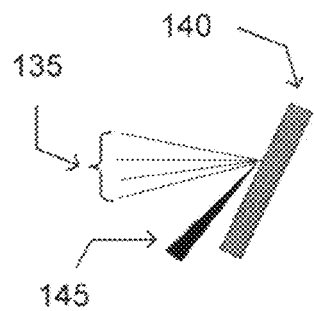

FIG. 1b depicts a broadband laser beam 120 striking a spectrally dispersive element 125. As the beam 120 diffracts from the spectrally dispersive element 125, the spectral components in an output beam 130 are dispersed in different directions. In other words, the frequency of the resultant output beam 130 varies across the resultant beam 130. In short, the resultant output beam 130 undergoes spatial chirping. Thus the resultant output beam 130 may be of degraded quality. FIG. 1c depicts four broadband laser beams 135 with precise central wavelengths striking and reflecting from a spectrally dispersive element 140. Although the beams 135 have precise central wavelengths, because each beamlet undergoes some spatial chirping when diffracting from the spectrally dispersive element 140, the resultant beam 145 is dispersed. Consequently, the resultant beam 145 may be of degraded quality.

Figure 1D:
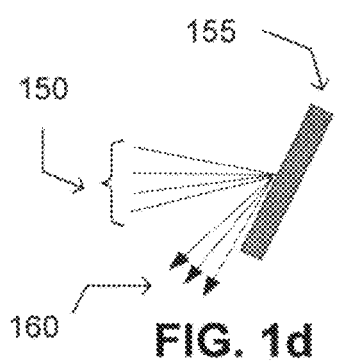

FIG. 1d depicts a plurality of single frequency laser beams with wavelength error 150 striking a spectrally dispersive element 155. The wavelengths of the beams 150 may not be well controlled or may drift over time. Consequently a resultant combined beam 160 may not be diffraction limited and thus may be of degraded quality.

Figure 2:
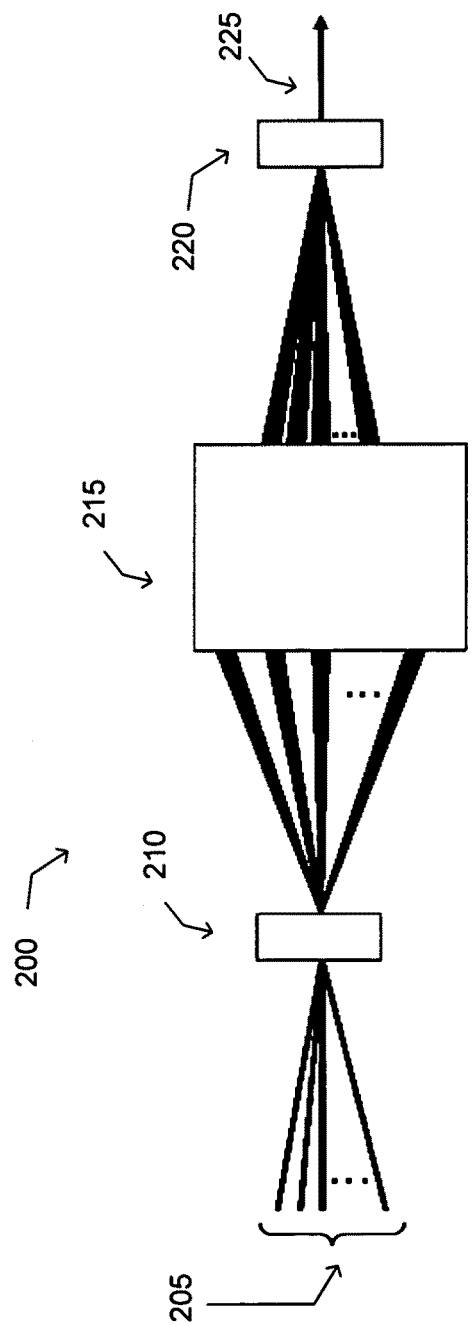
FIG. 2 is an overall view of an embodiment of the system for spectral beam combining and wavelength multiplexing.

Turning to FIG. 2, which is an overall view of the system and method for spectral beam combining 200 with minimal amount of spatial chirp in the combined beam 225. A plurality of laser beamlets 205 of differing wavelengths is projected onto a first spectrally dispersive element 210. The laser beamlets 205 depicted may be from a broadband laser, narrowband laser, fiber laser, continuous-wave laser, a pulsed laser, or any device or method that may be used to create a laser beam or laser beamlet.

Although the first spectrally dispersive element 210 depicted is a transmissive spectrally dispersive element, the spectrally dispersive element 210 may be reflective or transmissive. Types of spectrally dispersive elements that may be used in the system and method may include: diffraction gratings, volume Bragg gratings, prisms or grisms. The diffraction gratings may be transmissive, reflective, ruled or holographic.

The spectrally dispersive element 210 may produce a spatial chirp on the beamlets 205. The spatially chirped beamlets 205 may then be rearranged with a beam redirecting element 215. The beam redirecting element 215 may rearrange an angular separation between the spatially chirped beams such that the beamlets propagate in their proper directions for combining. The beam redirecting element 215 may be comprised of a first optical element, a staircase mirror and a second optical element. The first optical element and the second optical element may be focusing optics such as lenses or concave mirrors. The focusing optics may be parabolic, aspheric, spherical or cylindrical. The beam redirecting element 215 may redirect the spatially chirped beams to a second spectrally dispersive element 220. The second spectrally dispersive element 220 may act as a combining element that combines the spatially chirped beams into a single output beam 225. The first and second spectrally dispersive elements 210, 220 may be selected so as to produce the least amount of spatial chirp in the combined output beam 225 resulting in an output beam 225 that is diffraction limited. The first and second spectrally dispersive elements 210, 220 may be identical dispersive elements.

Figure 3:
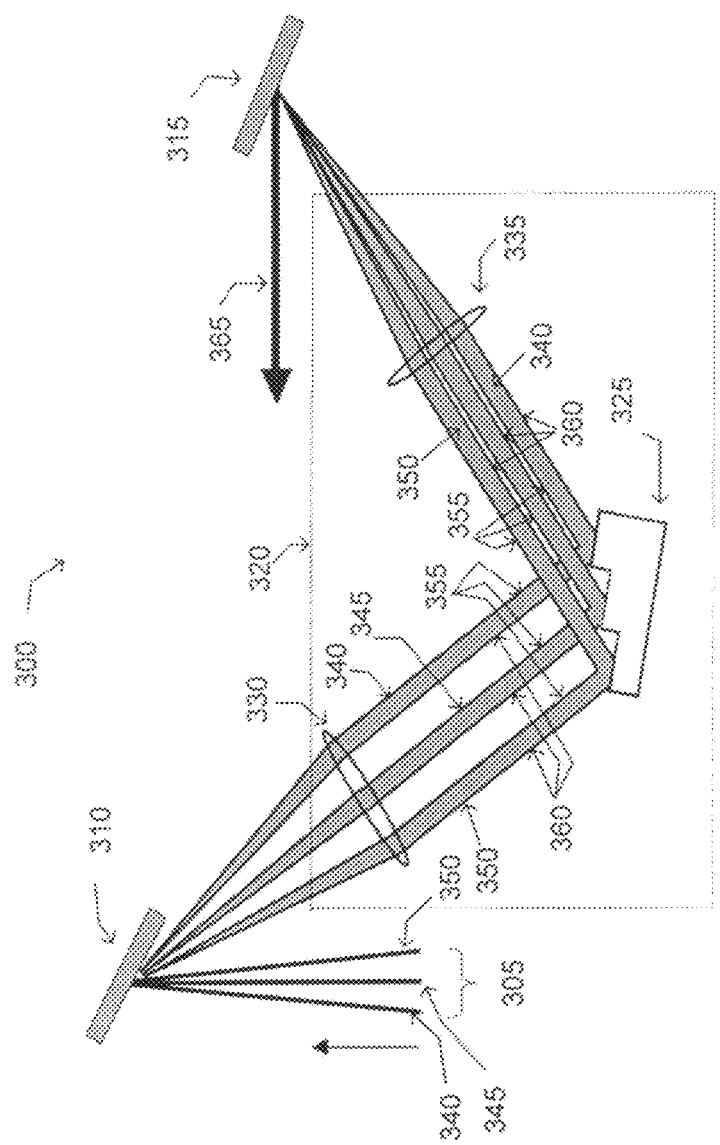
FIG. 3 depicts a center ray of a broadband laser beam propagating through an embodiment of the system.

Turning to FIG. 3, which is an embodiment of the system for spectral beam combining and wavelength multiplexing 300 showing a center ray of a laser beam propagating through the system 300. As one of ordinary skill in the art readily appreciates, a laser beam is comprised of a large number of rays or ray bundles. FIG. 3 depicts three rays 305 where each ray 340, 345, 350 is a center ray of a broadband laser beam. The rays 305 are shown as an example of how differing wavelengths within each center ray may diffract and the angles at which a center ray may diffract while propagating through the system 300.

The depicted embodiment is comprised of a first spectrally dispersive element 310, a second spectrally dispersive element 315 and a beam redirecting element 320 that is enclosed in a dashed box. The first spectrally dispersive element 310 may be a reflective diffraction grating. The second spectrally dispersive element 315 may also be a reflective diffraction grating, and the beam redirecting element 320 may be comprised of a staircase mirror 325, a first lens 330 and a second lens 335. The staircase mirror 325 may be manufactured by stacking super-polished plates with highly reflective coatings.

A plurality of laser beamlets or center rays 305 of differing wavelengths may be projected onto the first spectrally dispersive element 310. To avoid angularly dependent aberration, the beamlets 305 are collimated or nearly collimated at the first dispersive element 310. One of ordinary skill in the art will readily appreciate that a collimated laser beam propagates for long distances without substantial beam size growth. Herein, relative positions of the center rays 305 are viewed from the perspective of the direction a beamlet, beam or ray is travelling. Thus, when looking at the three center rays 305 of FIG. 3, the viewing perspective would be as if one were looking towards the first spectrally dispersive element 310 from beamlets' 305 point of origin. From this viewing perspective, from left to right, a first center ray 340 may appear on a left side, a second center ray 345 may appear in a middle and a third center ray may appear on a right side 350. The center rays 305 may be arranged, from left to right, such that the beamlets 305 are of decreasing wavelength. Thus the first beamlet 340 may be of a longest wavelength. The second beamlet 345 may be of shorter wavelength than the first 340, and a third beamlet 350 may be of a wavelength shorter than the first and second beamlets 340, 345. The beamlets 305 may be projected such that the beamlets 305 overlap at the first spectrally dispersive element 310.

The first spectrally dispersive element 310 may diffract the beamlets 305 and produce a spatial chirp on the beamlets 305. The spectral content of each broadband center ray 340, 345, 350 may be dispersed at a slightly different angle as depicted by the widening of the center rays 340, 345, 350 after the rays 340, 345, 350 diffract from the first spectrally dispersive element 310. The spatially chirped beamlets 305 may pass through the first lens 330 of the beam redirecting element 320. The first lens 330 projects each beamlet 340, 345, 350 onto a step of the staircase mirror 325. The first lens 330 may collimate the various spectral components of each beamlet 305 as depicted in FIG. 3. The first lens may also focus the individual spectral component of each beamlet as will be depicted in FIG. 4.

After the beamlets 305 are diffracted off the first spectrally dispersive element 310 and before the spatially chirped beamlets 305 strike the staircase mirror 325, the spatially chirped beamlets 305 are in the same relative order the beamlets are in when approaching the first spectrally dispersive element 310. When looking at the beamlets 305 from left to right using the perspective described earlier, the spatially chirped beamlets 305 may remain arranged such that the beamlets 305 are of increasing wavelength. After diffracting from the first spectrally dispersive element 310, the first beamlet 340 with the longest wavelength remains on the left, the second beamlet 345 remains in the middle and the third beamlet 350 with the shortest wavelength remains on the right.

The spatial chirp produced by the first spectrally dispersive element 310 may affect each beamlet 340, 345, 350 such that each beamlet 340, 345, 350 has a left side portion 355 of a longer wavelength than a right side 360 portion of a shorter wavelength. As the beamlets approach the staircase mirror, the beamlet wavelengths and the wavelength components are collimated and are ordered with decreasing wavelength from left to right. However, the beamlets are not properly spaced for beam combining on a second grating. The staircase mirror may produce a set of properly spaced beamlets for beam combining. After the spatially chirped beamlets 305 reflect from the staircase mirror 325, the beamlets are appropriately separated with the beamlets and their spectral components in the proper wavelength order for combination into a single beam.

The spatially chirped beamlets 305 that reflected off the staircase mirror 325 may travel towards the second lens 335 of the beam redirecting element 320. The second lens 335 may direct the beamlets with all their spectral contents onto a point on the second spectrally dispersive element 315. The second spectrally dispersive element 315 may combine the beamlets into a single output beam 365.

As the beamlets 305 approach the second spectrally dispersive element 315 the relative positions of the beamlets 305 are opposite the position of the beamlets 305 as they approached the first spectrally dispersive element 310. Furthermore, the left sides 355 of the beamlets 340, 345, 350 have a shorter wavelength than a right side 360. When the beamlets 340, 345, 350 refract from or are combined by the second spectrally dispersive element 315, the second spectrally dispersive element 315 may produce a spatial chirp on the beamlets 340, 345, 350 that is opposite the spatial chirp produced by the first spectrally dispersive element 310. In other words, the second spectrally dispersive element 315 may compensate for the spatial chirp produced by the first spectrally dispersive element 310. This may result is an output beam 365 that is a diffraction limited beam. Compensating for the spatial chirp produced by the first spectrally dispersive element 310 to produce a diffraction limited output beam 365 may allow for a large acceptance bandwidth.

Figure 4:
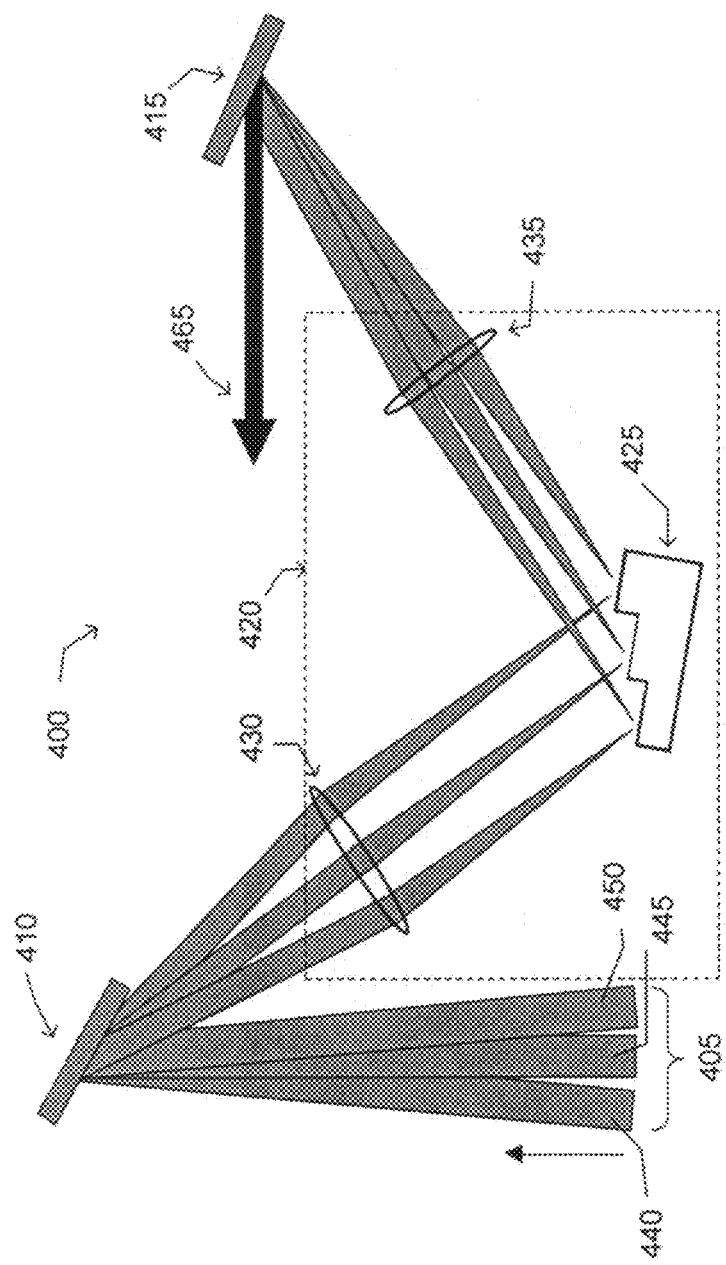
FIG. 4 illustrates how a beam size of a single frequency, or narrow wavelength laser beam may propagate through an embodiment of the system.

Turning to FIG. 4, which illustrates how the beam sizes of single frequency laser beams or laser beams that have narrow wavelength linewidths propagate through the embodiment depicted in FIG. 3. Laser beams 405 of a single frequency or laser beams that have narrow wavelength linewidths may propagate through the system 400 in the same manner as depicted in FIG. 3. As previously mentioned, a laser beam has physical size. The physical size of a beam may be thought of as many rays bundled together. That is why at the point of origination the beams 405 are thicker than the rays 305 of FIG. 3.

The depicted embodiment is comprised of a first spectrally dispersive element 410, a second spectrally dispersive element 415 and a beam redirecting element 420. The first spectrally dispersive element 410 may be a reflective diffraction grating. The second spectrally dispersive element 415 may also be a reflective diffraction grating, and the beam redirecting element may be comprised of a staircase mirror 425, a first lens 430 and a second lens 435.

Three laser beams 405 of differing wavelength are projected onto the first spectrally dispersive element 410. The beams 405 may be collimated or nearly collimated as the beams 405 are incident on the first spectrally dispersive element 410. The beams 405 are projected such that the beams 405 may overlap on the first spectrally dispersive element 410.

From left to right, a first beam 440 may appear on the left, a second beam 445 may appear in the middle and a third beam 450 may appear on the right. The beams 405 may be arranged, from left to right, such that the beams 405 are of decreasing wavelength. Thus the first beam 440 may be of a longest wavelength. The second beam 445 may be of shorter wavelength than the first, and a third beam 450 may be of a wavelength shorter than the first and second beams 440, 445.

The first spectrally dispersive element 410 may diffract the beams 405 and produce a spatial chirp on the beams 405. The beam size of a narrow wavelength within each beamlet 440, 445, 450 remains collimated after diffracting from the first dispersive element 410 and is focused by the first lens 430 onto a step of the staircase mirror 425. The staircase mirror 425 may rearrange the spectral contents of the beams 405 as described earlier in FIG. 3. The staircase mirror 425 should be located approximately equal to a focal length distance of the first lens 430 from the first lens 430. Placing the staircase mirror 425 the focal length distance from first lens 430 allows for the largest acceptance bandwidth as limited by the beams clipping the edges of the staircase mirror 425. Also, the staircase mirror 425 should be located approximately equal to a focal length distance of the second lens 435 from the second lens 435.

The spatially chirped beams 405 that reflect from the staircase mirror 425 may travel towards the second lens 435 of the beam redirecting element 420. The second lens 435 may collimate the individual spatial components with each beam 440, 445, 450 and may direct the beams 440, 445, 450 with all the spectral contents onto a point on the second spectrally dispersive element 415. The second spectrally dispersive element 415 may combine the beams 405 into a single output beam 465.

As previously described, the second spectrally dispersive element 415 may compensate for the spatial chirp produced by the first spectrally dispersive element 410. This may result is an output beam 465 that is a diffraction limited beam. Compensating for the spatial chirp produced by the first spectrally dispersive element 410 to produce a diffraction limited output beam 465 may allow for a large acceptance bandwidth.

Figure 5:
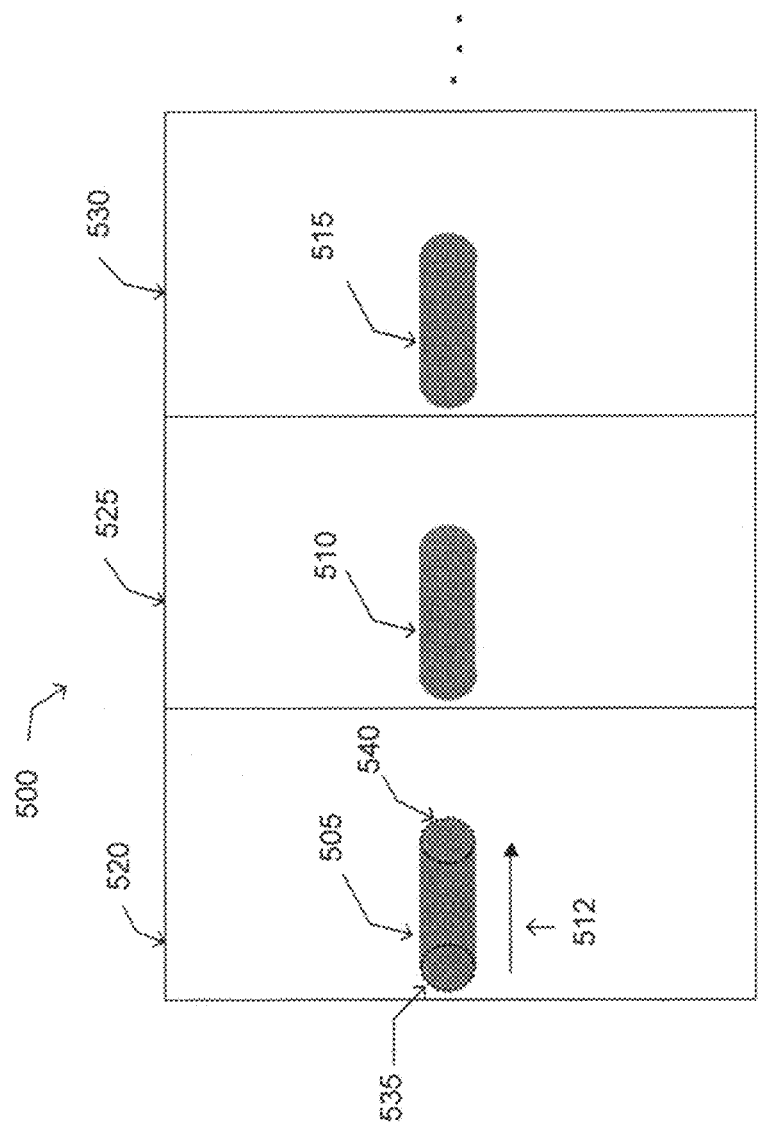
FIG. 5 depicts an overhead view of beam footprints on two steps of a staircase mirror.

Turning to FIG. 5, which is an overhead view of beam footprints 505, 510, 515 on a staircase mirror 500. Three steps 520, 525, 530 of the staircase mirror 500 are shown. Each step 520, 525, 530 contains a beam footprint 505, 510, 515. A broadband laser beam striking the staircase mirror 500 may cause the beam footprints depicted 505, 510, 515. The footprints 505, 510, 515 show the physical extent of the beam as well as the spectral extent. The beams striking the staircase mirror 500 may be the beams 305 depicted in FIG. 3 as the beams 305 strike the staircase mirror 325 of FIG. 3.

In viewing a first beam footprint 505 on a first step 520, a wavelength of the beam footprint 505 is spread out on the step 520. As beams approach the staircase mirror 500, the beams may be spatially chirped. Thus, wavelengths of the beams may vary across each beam. Therefore the wavelength of each beam footprint 505, 510, 515 may vary across each footprint 520. For example, looking across the first beam footprint 505 from left to right 512, the wavelength of a left side 535 of the first beam footprint 505 may be shorter, while the wavelength of a right side 540 of the beam footprint 505 may be longer. Thus when looking at the first beam footprint 505, the left side 535 may be a bluer color while the right side 540 may be a redder color. The wavelengths of the second and third footprints 510, 515 may vary in a similar manner. Clipping of wavelengths at the edges of the staircase mirror 500 may define the acceptance bandwidth of beams input into the system.

Figure 6:
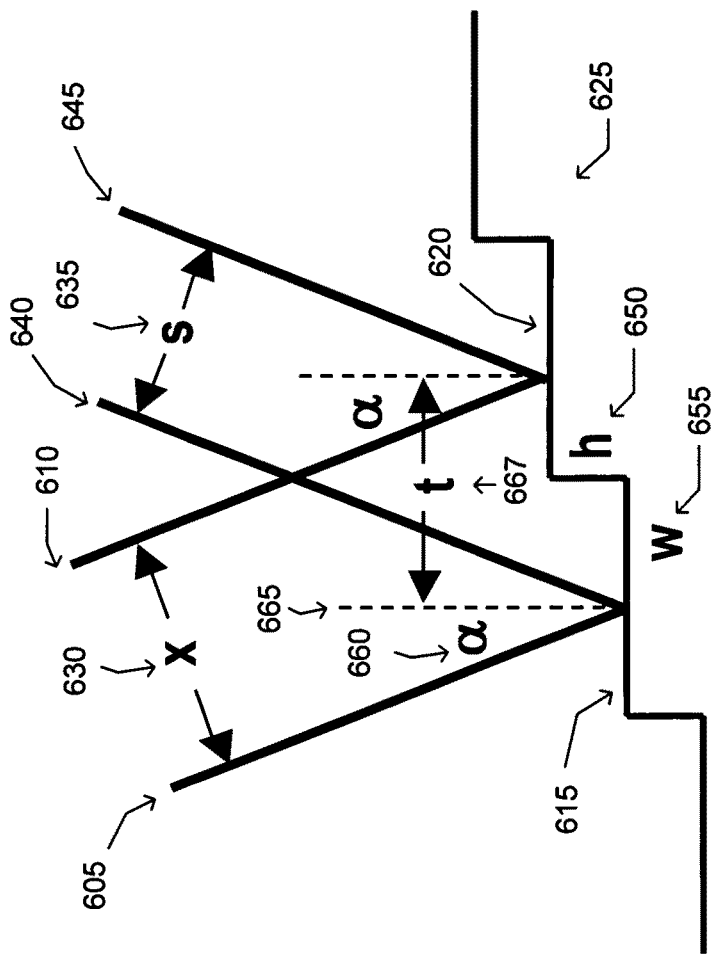
FIG. 6 illustrates how physical parameters of the staircase mirror are determined.
Figure 9:
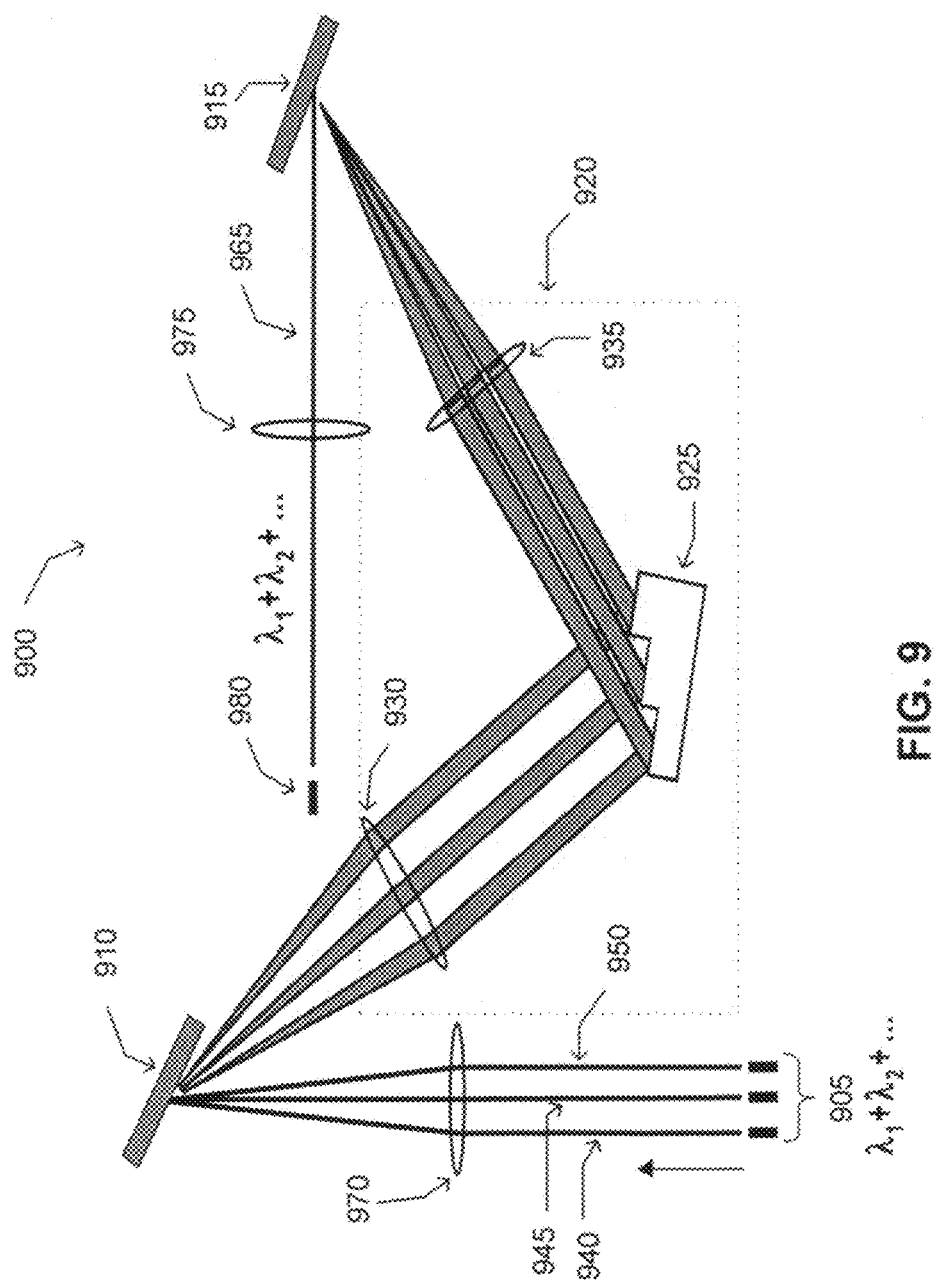
FIG. 9 is an embodiment of the system that may be used for spectral beam combining and wavelength multiplexing and demultiplexing.

Turning to FIG. 6, which illustrates how physical parameters of a staircase mirror 625 are determined given a wavelength separation between adjacent input channels and the dispersion properties of a first and second spectrally dispersive elements. FIG. 9 depicts two rays 605, 610 striking two steps 615, 620 of the staircase mirror 625. The two rays 605, 610 may correspond to the center wavelengths within the wavelength passband for the two adjacent beamlet channels. The initial separation between the two rays 605, 610 is denoted by 'x' 630, and is determined by their wavelength separation and the dispersion properties of a first spectrally dispersive element.

Similarly the desired separation, denoted by 's' 635, between the reflected beams 640, 645 is determined by the wavelength separation between the two adjacent beamlet channels and the dispersion properties of a second spectrally dispersive element. The reflected beams 640, 645 must be separated by the distance 's' 635 so that the second spectrally dispersive element may combine the beamlets 640, 645 into a single output beam.

A height, 'h' 650, of each step 615, 620 may be determined by the equation:

$$h=(x-s)/2 \sin(\alpha)$$

A width, 'w' 655, of each step 615, 620 may be determined by the equation:

$$w=(x+s)/2 \cos(\alpha)$$

Alpha ('α') 660 is an angle between a normal to a point of incidence and an incident beam. For example, in looking at a first incident beam 605, a point of incidence is the point where the incident beam 605 strikes a step 615 of the staircase mirror 625. A normal 665 to this point of incidence is a line projecting upwards from the step 615 that is perpendicular to the step 615 of the staircase mirror 625 at the point of incidence. Thus 'α' 660 is the angle between the normal 665 to the point of incidence and the incident beamlet 605. The incidence angle 'α' 660 is a free design parameter and is chosen so that the staircase mirror 625 may be easily fabricated. Further, the distance 't' 667 may be a distance between two normals to points of incidence on two consecutive steps. The distance 't' 667 may be equivalent to the distance 'w' 655.

Figure 7:
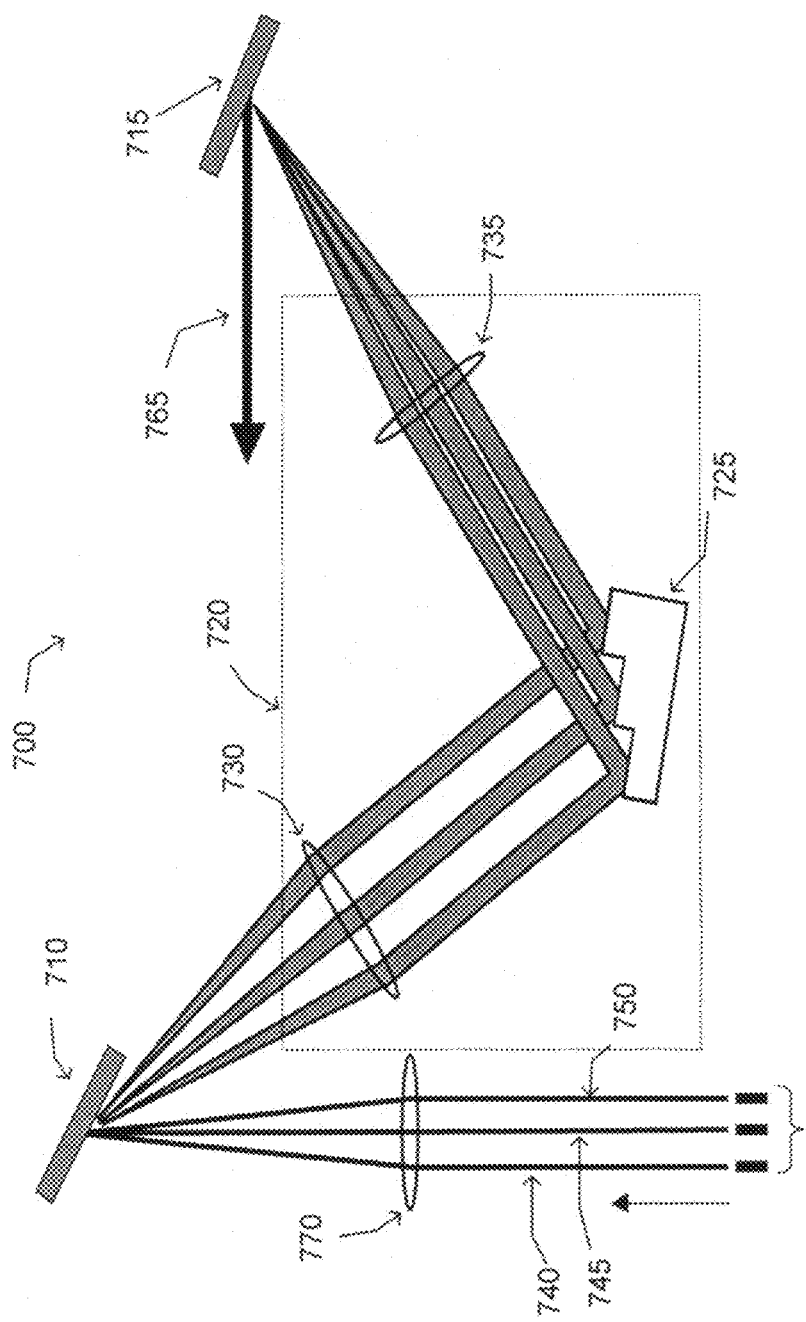
FIG. 7 illustrates a center ray of a broadband laser beam propagating through an embodiment of the system.

Turning to FIG. 7, which illustrates the propagation of a center ray of broadband laser beams through another embodiment of the system for spectral beam combining and wavelength multiplexing 700. The depicted embodiment may be comprised of a first spectrally dispersive element 710, a second spectrally dispersive element 715 and a beam redirecting element 720. The first spectrally dispersive element 710 may be a reflective diffraction grating. The second spectrally dispersive element 715 may also be a reflective diffraction grating. The beam redirecting element 720 may be comprised of a staircase mirror 725, a first lens 730 and a second lens 735. The system 700 may be further comprised of a collimating lens 770.

Three fiber lasers 705 emit broadband laser beamlets 740, 745, 750 of differing wavelength. For purposes of illustration only the center ray of the beamlets 740, 745, 750 are depicted. The rays 740, 745, 750 may be projected through the collimating lens 770 such that the beamlets 740, 745, 750 are collimated or nearly collimated at the first dispersive element 710. The beamlets 740, 745, 750 are collimated or nearly collimated at the first dispersive element 710 to avoid angularly dependent aberration. The separation of the fibers 705 may determine the angle of incidence of the center rays 740, 745, 750 on the first spectrally dispersive element 710.

From left to right, a first ray 740 may appear on a left side, a second ray 745 may appear in a middle position and a third ray 750 may appear on a right side. The rays 740, 745, 750 may be arranged, from left to right, such that the rays 740, 745, 750 are of decreasing wavelength. Thus the first ray 740 may be of a longest wavelength. The second ray 745 may be of shorter wavelength than the first 740, and a third ray 750 may be of a wavelength shorter than the first 740 and second rays 745.

The first spectrally dispersive element 710 may diffract the rays 740, 745, 750 and produce a spatial chirp on the rays 740, 745, 750. After the rays 740, 745, 750 have diffracted from the first dispersive element 710, the rays 740, 745, 750 may propagate through the system 700 as illustrated and described in FIG. 3. Thus rays 740, 745, 750 may be projected onto the staircase mirror 725. After the rays 740, 745, 750 are reflected from the staircase mirror 725, the rays 740, 745, 750 are in an opposite position relative to the position of the rays 740, 745, 750 as the rays 740, 745, 750 approached the staircase mirror 725.

The second lens 735 may direct the rays 740, 745, 750 with all their spectral contents onto a point on the second spectrally dispersive element 715. The second spectrally dispersive element 715 may compensate for the spatial chirp produced by the first spectrally dispersive element 710 and the second spectrally dispersive element 715 may combine the rays 740, 745, 750 into a single output beam 765. Compensating for the spatial chirp produced by the first spectrally dispersive element 710 may produce a diffraction limited output beam 765 which allows for a large acceptance bandwidth and high spectral density.

Figure 8:
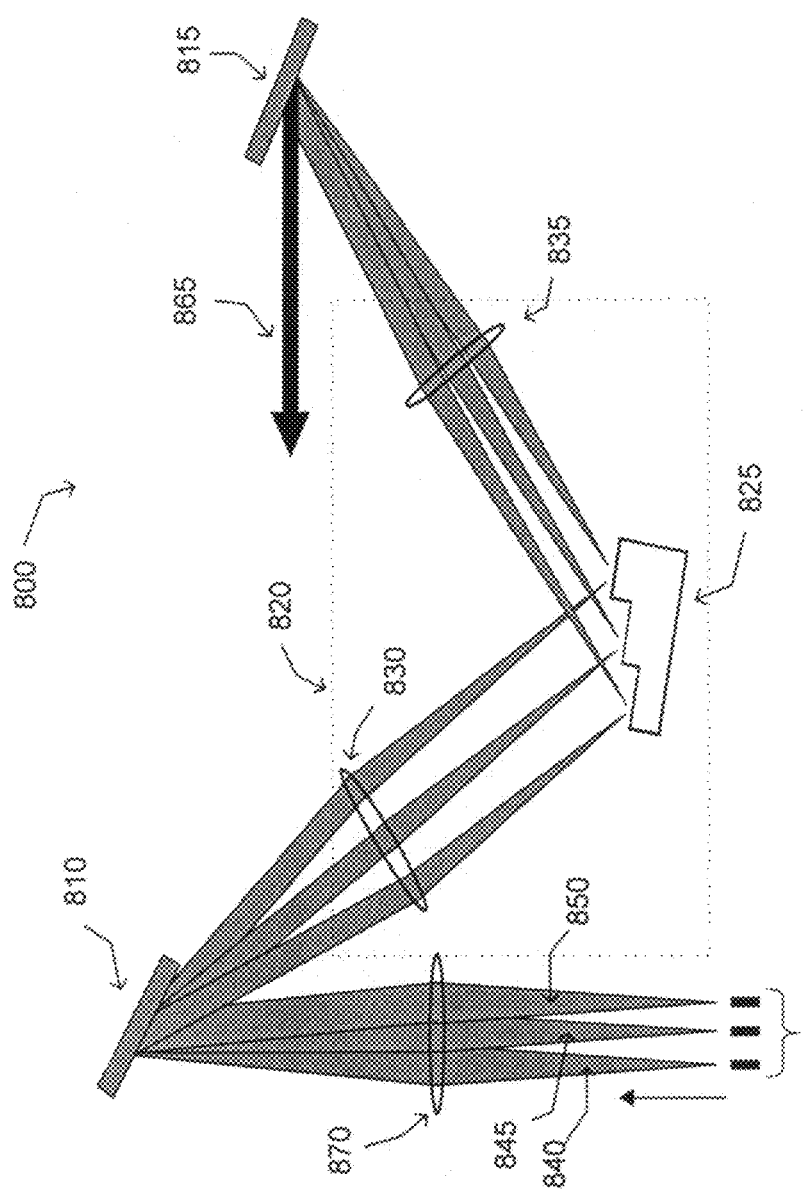
FIG. 8 illustrates how beam sizes of a narrow wavelength component of a fiber laser beam propagate through an embodiment of the system.

Turning to FIG. 8, which illustrates how the beam sizes of a narrow wavelength components from each fiber laser propagate through the embodiment depicted in FIG. 7. Laser beams 840, 845, 850 of a single frequency, or laser beams that have narrow wavelength linewidths may propagate through the system 800 in the same manner as depicted in FIG. 7. Fiber lasers 805 may emit laser beams 840, 845, 850 illustrated in this embodiment.

The depicted embodiment is comprised of a first spectrally dispersive element 810, a second spectrally dispersive element 815 and a beam redirecting element 820. The first spectrally dispersive element 810 may be a reflective diffraction grating. The second spectrally dispersive element 815 may also be a reflective diffraction grating, and the beam redirecting element 820 may be comprised of a staircase mirror 825, a first lens 830 and a second lens 835. The embodiment may also have a collimating lens 870.

A plurality of fiber lasers 805 may emit broadband laser beams 840, 845, 850 of differing wavelength. The beams 840, 845, 850 are projected through the collimating lens 870 such that the beams 840, 845, 850 are collimated or nearly collimated as the beams 840, 845, 850 are incident on the first spectrally dispersive element 810. Further, the beams 840, 845, 850 are projected such that the beams 840, 845, 850 may overlap on the first spectrally dispersive element 810.

From left to right, a first beam 840 may appear on a left side, a second beam 845 may appear in a middle position and a third beam 850 may appear on a right side. The beams 840, 845, 850 may be arranged, from left to right, such that the beams 840, 845, 850 are of increasing wavelength. Distances between components of the system 800 may be as described in association with FIG. 4. Further, the beams 840, 845, 850 may propagate through the system 800 as described in association with FIG. 4.

As the beams 840, 845, 850 propagate through the system 800, the beams 840, 845, 850 reflect from the staircase mirror 825 and are rearranged. As the beams 840, 845, 850 approach the second dispersive element 815 the beams 840, 845, 850 may be in an opposite position relative to the position of the beams 840, 845, 850 as the beams 840, 845, 850 approached first spectrally dispersive element 810. The second spectrally dispersive element 815 may combine the beams 840, 845, 850 into a single output beam 865.

As previously described, the second spectrally dispersive element 815 may compensate for the spatial chirp produced by the first spectrally dispersive element 810. This may result in an output beam 865 that is a diffraction limited beam. Compensating for the spatial chirp produced by the first spectrally dispersive element 810 to produce a diffraction limited output beam 865 may allow for a large acceptance bandwidth.

Turning to FIG. 9, which is an illustration of an embodiment of the system for spectral beam combining and wavelength multiplexing 900 that may be used for multiplexing or demultiplexing multiple wavelength signals in a fiber optic telecommunications system. The system 900 may be used to combine wavelength signals with large acceptance bandwidth that may be transmitted long distances through a fiber optic cable. Wavelengths may need to be combined (multiplexed) and/or separated (de-multiplexed) at a transmitter end, receiver end, or at add-drop nodes.

The embodiment depicted in FIG. 9 may be comprised of the same elements depicted in the embodiment of FIG. 7 with the addition of a lens 975 and an optical fiber 980. Three beamlets 940, 945, 950 propagate through the embodiment depicted in FIG. 9 just as three beamlets 740, 745, 750 did in the embodiment depicted in FIG. 7. The beamlets 940, 945, 950 may be of differing wavelengths. In the embodiment of FIG. 9 an output beam 965 is coupled to an optical fiber 980 by a single lens (or concave mirror) 975. The output beam 965 may be a single beam comprised of the beamlets 940, 945, 950 of differing wavelengths. Further, the output beam 965 may multiplex signals that propagate through the optical fiber 980.

Although not depicted, the system and methods for spectral beam combining and wavelength multiplexing with an optical redirecting element may also be implemented using a Littrow configuration. One of ordinary skill in the art would readily appreciate that a Littrow configuration is a geometry where the light of a specific wavelength diffracted from a grating travels back along the direction of the incident beam.

What is claimed is:

1. A method of spectral beam combining, comprising the steps of:
    projecting a plurality of laser beamlets comprising a first ordering of different wavelengths onto a first spectrally dispersive element;
    spatially chirping the plurality of beamlets via the first spectrally dispersive element;
    rearranging the spatially chirped beamlets with a beam redirecting element, wherein said beam redirecting element further comprises a first optical element, a staircase mirror and a second optical element; and
    combining the rearranged beamlets into a single output beam via a second spectrally dispersive element.

2. The method of claim 1 wherein the single output does not exhibit spatial chirp.

3. The method of claim 1 wherein the plurality of laser beamlets are emitted by at least one of a plurality of fiber lasers, a plurality of optical fibers or a plurality of diode lasers; and
    where projecting the plurality of laser beamlets onto the first spectrally dispersive element further comprises overlapping the beamlets onto the spectrally dispersive element.

4. The method of claim 1 wherein projecting the plurality of laser beamlets onto the first spectrally dispersive element further comprises collimating the plurality of laser beamlets.

5. The method of claim 1 wherein combining the beamlets into a single output beam further comprises coupling the output beam into an optical fiber.

6. The method of claim 1 wherein rearranging the spatially chirped beamlets with the beam redirecting element further comprises rearranging an angular separation between the spatially chirped beams.

7. The method of claim 1 wherein the staircase mirror further comprises a plurality of steps; and
    the staircase mirror has a step height related to an angle of incidence of a first incident beam, an approximate distance between the first incident beam and a second incident beam, and an approximate distance between a first reflected beam and a second reflected beam.

8. The method of claim 7 wherein a step width is related to an angle of incidence of a first incident beam, a distance between the first incident beam and a second incident beam, and a distance between a first reflected beam and a second reflected beam.

9. The method of claim 1 wherein the first optical element comprises at least one of a first lens or a conic section mirror wherein the first lens comprises at least one of a cylindrical lens or a spherical lens, and the second optical element comprises at least one of a second lens or a conic section mirror wherein the second lens comprises at least one of a cylindrical lens or a spherical lens.

10. The method of claim 1 wherein the plurality of laser beamlets comprising a first ordering further comprises a first sequential arrangement based on a wavelength of each beamlet such that the beamlets are arranged in one of an ascending or descending order.

11. The method of claim 10 wherein the opposite order is a second sequential ordering based on a wavelength of each beamlet.

12. The method of claim 1 wherein each spatially chirped beamlet has a first side and a second side wherein rearranging the spatially chirped beamlets further comprises for each beamlet interchanging the first side and the second side.

13. The method of claim 1 wherein the plurality of spatially chirped beamlets comprises a first sequential order based on a wavelength of each beamlet where the first sequential order is one of an ascending or descending order; and
    wherein rearranging the plurality of spatially chirped beamlets further comprises rearranging the spatially chirped beamlets into a second sequential order where the second sequential order is based on a wavelength of each beamlet such that if the first sequential order is an ascending sequential order the second sequential order is a descending sequential order, and if the first sequential order is a descending sequential order the second sequential order is an ascending sequential order.

14. The method of claim 1 wherein the first spectrally dispersive element and second spectrally dispersive element comprises at least one of a diffraction grating, a volume Bragg grating, a prism or a grism; and
wherein the diffraction grating is at least one of a transmissive diffraction grating, a reflective diffraction grating, a ruled diffraction grating or a holographic diffraction grating.

15. A system comprising:
a plurality of laser beamlets comprising a first ordering;
a first spectrally dispersive element;
a second spectrally dispersive element;
a beam redirecting element further comprising a first optical element, a staircase mirror and a second optical element;
wherein the plurality of laser beamlets are projected onto the first spectrally dispersive element, which spatially chirps the beamlets; and
the plurality of spatially chirped beamlets are projected onto the beam redirecting element which rearranges the spatially chirped beamlets into an opposite ordering from the first ordering and where the beam redirecting element rearranges the spatially chirped beamlets into a single output beam via the second spectrally dispersive element.

16. The system of claim 15 wherein the single output beam does not exhibit spatial chirp.

17. The system of claim 15 wherein projecting a plurality of laser beamlets onto the first spectrally dispersive element further comprises overlapping the beamlets onto the first spectrally dispersive element; and
wherein the plurality of laser beamlets are emitted by at least one of a plurality of fiber lasers, a plurality of optical fibers, or a plurality of diode lasers.

18. The system of claim 15 wherein projecting a plurality of laser beamlets onto the first spectrally dispersive element further comprises collimating the plurality of laser beamlets.

19. The system of claim 15 wherein the output beam is coupled to an optical fiber.

20. The system of claim 15 wherein rearranging the spatially chirped beamlets with a beam redirecting element further comprises rearranging an angular separation between the spatially chirped beams.

21. The system of claim 15 wherein the staircase mirror is further comprised of a plurality of steps, and the staircase mirror has a step height related to an angle of incidence of a first incident beam, an approximate distance between the first incident beam and a second incident beam, and an approximate distance between a first reflected beam and a second reflected beam.

22. The system of claim 21 wherein a step width is related to an angle of incidence of a first incident beam, a distance between the first incident beam and a second incident beam, and a distance between a first reflected beam and a second reflected beam.

23. The system of claim 15 wherein the first optical element comprises at least one of a first lens or conic section mirror where the first lens comprises at least one of a cylindrical lens or a spherical lens and the second optical element comprises at least one of a second lens or a conic section mirror where the second lens comprises at least one of cylindrical lens or a spherical lens.

24. The system of claim 23 wherein a distance between first lens and the staircase mirror is substantially equal to a focal length of the first lens, and a distance between the second lens and the staircase mirror is substantially equal to a focal length of the second lens.

25. The system of claim 15 wherein the plurality of spatially chirped beamlets comprising a first ordering further comprises a first sequential arrangement based on a wavelength of each beamlet such that the beamlets are arranged in one of an ascending or descending order.

26. The system of claim 15 where the opposite ordering is a second sequential ordering based on a wavelength of each beamlet.

27. The system of claim 15 wherein each spatially chirped beamlet has a first side and a second side wherein rearranging the spatially chirped beamlets further comprises interchanging the first side and the second side.

28. The system of claim 15 wherein the plurality of spatially chirped beamlets comprises a first sequential order based on a wavelength of each beamlet where the first sequential order is one of an ascending or descending order; and
wherein rearranging the plurality of spatially chirped beamlets further comprises rearranging the spatially chirped beamlets into a second sequential order where the second sequential order is based on a wavelength of each rearranged beamlet such that if the first sequential order is an ascending sequential order the second sequential order is a descending sequential order, and if the first sequential order is a descending sequential order the second sequential order is an ascending sequential order.

29. The system of claim 15 wherein the first spectrally dispersive element and second spectrally dispersive element comprises at least one of a diffraction grating, a volume Bragg grating, a prism or a grism; and
wherein the diffraction grating is at least one of a transmissive diffraction grating, a reflective diffraction grating, a ruled diffraction grating or a holographic diffraction grating.

* * * * *